United States Patent

Yamakoshi et al.

[11] Patent Number: 5,560,689
[45] Date of Patent: Oct. 1, 1996

[54] LIQUID PRESSURE CONTROL DEVICE FOR LOAD RESPONDING BRAKE

[75] Inventors: Mutsuro Yamakoshi; Shinichi Inagaki, both of Higashimatsuyama, Japan

[73] Assignee: Jidosha Kiki Co., Ltd., Tokyo, Japan

[21] Appl. No.: 437,961

[22] Filed: May 10, 1995

[30] Foreign Application Priority Data

May 20, 1994 [JP] Japan .................... 6-106385

[51] Int. Cl.⁶ .................... B60T 8/26; B60T 8/18; B60T 8/30
[52] U.S. Cl. .................... 303/22.8; 188/195; 303/9.69
[58] Field of Search .................... 303/22.1, 9.69, 303/9.63, 9.71, 9.75, 22.4, 22.8, 9.61; 188/195, 349

[56] References Cited

U.S. PATENT DOCUMENTS

| | | | |
|---|---|---|---|
| 3,329,471 | 7/1967 | Oberthur | 303/9.69 |
| 3,832,007 | 8/1974 | Thrush | 303/9.71 |
| 4,111,495 | 9/1978 | Peeples | 303/9.69 X |
| 4,281,880 | 8/1981 | Gaiser et al. | 303/9.63 |

FOREIGN PATENT DOCUMENTS

| | | | |
|---|---|---|---|
| 3508269 | 9/1986 | Germany | 303/22.8 |
| 58-10191 | 1/1983 | Japan . | |
| 6-50024 | 1/1994 | Japan . | |

*Primary Examiner*—Douglas C. Butler
*Attorney, Agent, or Firm*—Patterson & Streets, L.L.P.

[57] ABSTRACT

An object of the present invention is to decrease the machining cost and to improve the productivity. A liquid pressure control device (21) for load responding brake comprises a valve mechanism (25), which is slidably disposed in a housing (22), for decreasing the liquid pressure of a master cylinder in a predetermined proportion and transmitting the liquid pressure to a rear wheel brake cylinder by the movement of a plunger (24) operated in response to the liquid pressure from the master cylinder; and a load sensing mechanism (27) in which a load depending on the movable load of a vehicle is applied to the plunger (24) so as to move the pressure decrease operation start point of the valve mechanism (25). The housing (22) is formed by cutting a long material (50) formed by extrusion or drawing to a predetermined length and then by machining the cut material (51).

1 Claim, 3 Drawing Sheets

LIQUID PRESSURE CONTROL DEVICE FOR LOAD RESPONDING BRAKE

FIELD OF THE INVENTION AND RELATED ART STATEMENT

The present invention relates to a liquid pressure control device for load responding brake which is used for motor vehicles and, more particularly, to the improvement in the housing construction thereof.

The liquid pressure control device for load responding brake, which is disposed halfway in a liquid passage running from a brake master cylinder to a rear wheel brake cylinder, gives a braking force equal to that on the front wheel side to the rear wheels at the low braking force time at the early stage of braking and gives a braking force of a predetermined proportion of that on the front wheel side to the rear wheels when the braking force exceeds a predetermined value (the operation start point A in FIG. 3), thereby preventing rear wheel lock.

On vehicles such as trucks, the amount of braking force in which rear wheel lock takes place depends on the amount of the movable load. Therefore, the braking force for starting the decrease in rear wheel braking force is set so as to be high when the movable load is high and to be low when the movable load is low.

One of the liquid pressure control device for load responding brake relating to the present invention has a cross section shown in FIG. 4.

In this figure, a liquid pressure control device 1, which is usually installed on the chassis side of a vehicle (for example, an automobile), operates a valve mechanism 5 formed in a housing 2 by the movement of a plunger 4, which is disposed slidably in the housing 2 and operates in response to the liquid pressure from a not illustrated brake master cylinder via an inlet port 3. By the operation of this valve mechanism 5, the liquid pressure transmitted from the master cylinder through the inlet port 3 is decreased in a predetermined proportion and sent to a not illustrated rear wheel brake cylinder through an outlet port 6.

To give a characteristic depending on the movable load of the vehicle to the valve mechanism 5, a force depending on the movable load is applied to the plunger 4 via a load sensing mechanism 7 so as to move the pressure decrease operation start point of the valve mechanism 5. The load sensing mechanism 7 includes a load sensing lever 8 one end of which is supported by the housing 2 of the valve mechanism 5 so as to be capable of oscillating, a tension spring 10, one end of which is connected to the axle side 9 and the other end is connected to the other end of the load sensing lever 8, for giving an urging force depending on the movable load of the vehicle, and a press member 11, which is disposed on the load sensing lever 8, for pressing the plunger 4 in the valve opening direction. A stopper bolt 12, screwed into a part of the housing 2, fixes the movement of the load sensing lever 8 by means of a spring 13 disposed between the press member 11 and the housing 2 when the tension spring 10 is broken.

The operation of the above-described liquid pressure control device is normally performed when the liquid pressure of the front wheel brake system of the master cylinder is applied to another inlet port 14 provided on the liquid pressure control device 1. In the case where the liquid pressure control device 1 is installed on the vehicle, when the braking becomes improper in an abnormal condition, for example, because of the occurrence of oil leakage in the front wheel brake system, sufficient braking of the rear wheel brake system becomes impossible. To solve this problem, a mechanism is provided in which the pressure decrease operation of the liquid pressure control device 1 is stopped to provide a sufficient braking force to the rear wheel side.

Specifically, of the front wheel brake system and the rear wheel brake system of the master cylinder, the liquid pressure of the front wheel brake system is applied to the inlet port 14 of the liquid pressure control device 1. When the liquid pressure of the front wheel brake system decreases abnormally because of oil leakage, a piston 15 moves downward to open a bypass passage 16 for stopping the pressure decrease operation so that the liquid pressure proportional to the depressing force applied to a brake pedal is sent to the rear wheel brake cylinder.

However, in the above-described liquid pressure control device 1 for load responding brake, the housing 2 is formed into a predetermined outside shape and hole shape by machining from aluminum or cast iron material individually. Therefore, the proportion of the machining cost to the total cost is high.

Also, to install a dustproof boot for protecting the end of the plunger 4 protruding from the outside of the housing 2, the grooving of the housing 2 is needed, so that the machining cost increases.

Further, the locking position of the stopper bolt 12 with respect to the end of the load sensing lever 8 of the load sensing mechanism 7 is adjusted to the operation position of valve mechanism 5 plus α (α denotes the movable range), it is necessary to make a threaded hole in a part of the housing 2 and to screw the stopper bolt 12 in this threaded hole. Therefore, the machining cost further increases.

OBJECT AND SUMMARY OF THE INVENTION

The present invention was made to solve the above problems. Accordingly, an object of the present invention is to provide a liquid pressure control device for load responding brake which solves the above problems and in which the machining cost of the housing is decreased and the productivity is improved.

A further object of the present invention is to provide a liquid pressure control device for load responding brake in which a locking position can be set against the movement of the load sensing lever end of the load sensing mechanism by using a simple configuration, and any movement other than the normal movement can be controlled.

A still further object of the present invention is to provide a liquid pressure control device for load responding brake in which it is unnecessary to perform grooving on the housing for installing the dustproof boot for protecting the plunger end.

To achieve the above objects, in a liquid pressure control device for load responding brake, comprising: a valve mechanism, which is slidably disposed in a housing, for decreasing the liquid pressure of a master cylinder in a predetermined proportion and transmitting the liquid pressure to a rear wheel brake cylinder by the movement of a plunger operated in response to the liquid pressure from the master cylinder; and a load sensing mechanism in which a load depending on the movable load of a vehicle is applied to the plunger so as to move the pressure decrease operation start point of the valve mechanism; the load sensing mechanism comprising a load sensing lever one end of which is supported by the housing of the valve mechanism so as to be capable of oscillating, a tension spring, one end of which is connected to the axle side and the other end is connected to the other end of the load sensing lever, for giving an urging force depending on the movable load of said vehicle, and a press member for pressing the plunger via the load sensing lever by means of the tension spring, (1) The housing is formed by cutting a long material formed by extrusion or drawing to a predetermined length and then by machining the cut material, (2) The housing is formed with a plane inclining with respect to the axis of the plunger on the side on which the tension spring is disposed, and the load sensing lever is provided with a locking member so that the tip end thereof engages with the inclining plane of the housing to control the movement of the load sensing lever in any direction other than the urging direction of the tension spring, and (3) A plug member for slidably protruding the end of the plunger in a fluid tight manner is provided, and a dustproof boot is mounted between the outer peripheral end of the plug member and the outer peripheral end of the press member of the load sensing mechanism.

Since the present invention is configured as describe above, the housing is formed by cutting long material formed by extruding or drawing to a predetermined length and then by machining the cut material. Therefore, the need for machining the outside shape of the housing is eliminated.

DETAILED DESCRIPTION OF A PREFERRED EMBODIMENT

Figure 1:
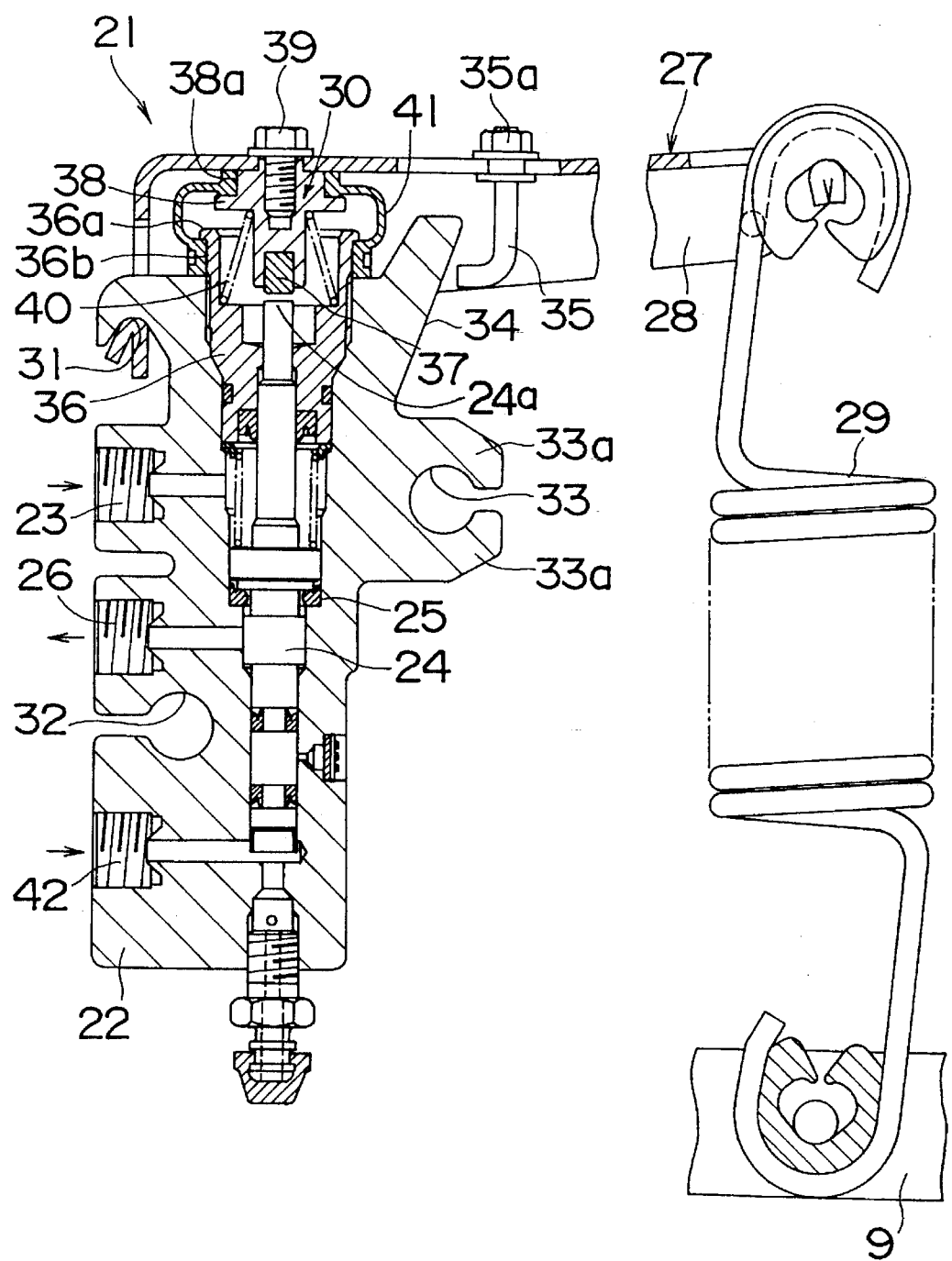
FIG. 1 is a longitudinal sectional view showing one embodiment of a liquid pressure control device for load responding brake in accordance with the present invention.

A preferred embodiment of the present invention will be described in detail in an exemplified manner with respect to the drawings. FIG. 1 is a longitudinal sectional view showing one embodiment of a liquid pressure control device for load responding brake in accordance with the present invention.

In this figure, a liquid pressure control device 21, which is usually installed on the chassis side of a vehicle such as an automobile, operates a closing valve 25 formed in a housing 22 by the movement of a plunger 24 made of a ferrous material, which is disposed slidably in the housing 22 in a fluid tight manner and operates in response to the liquid pressure from a not illustrated brake master cylinder via an inlet port 23. By the operation of this closing valve 5, the liquid pressure transmitted from the master cylinder through the inlet port 23 is decreased in a predetermined proportion and sent to a not illustrated rear wheel brake cylinder through an outlet port 26.

To give a characteristic depending on the movable load of the vehicle to the closing valve 25, a force depending on the movable load is applied to the plunger 24 via a load sensing mechanism 27 so as to move the pressure decrease operation start point of the closing valve 25. The load sensing mechanism 7 includes a load sensing lever 28, a tension spring 29, and a press member 30. One end of the load sensing lever 28 is supported as a fulcrum by one end 31 of the housing 22 of the closing valve 25 so as to be capable of oscillating. One end of a tension spring 29 is connected to the axle side 9 and the other end thereof is connected to the other end of the load sensing lever 28 to give an urging force depending on the movable load of the vehicle to the load sensing lever 28. The press member 11, which is disposed on the load sensing lever 28, presses the plunger 24 in the valve opening direction.

Figure 2:
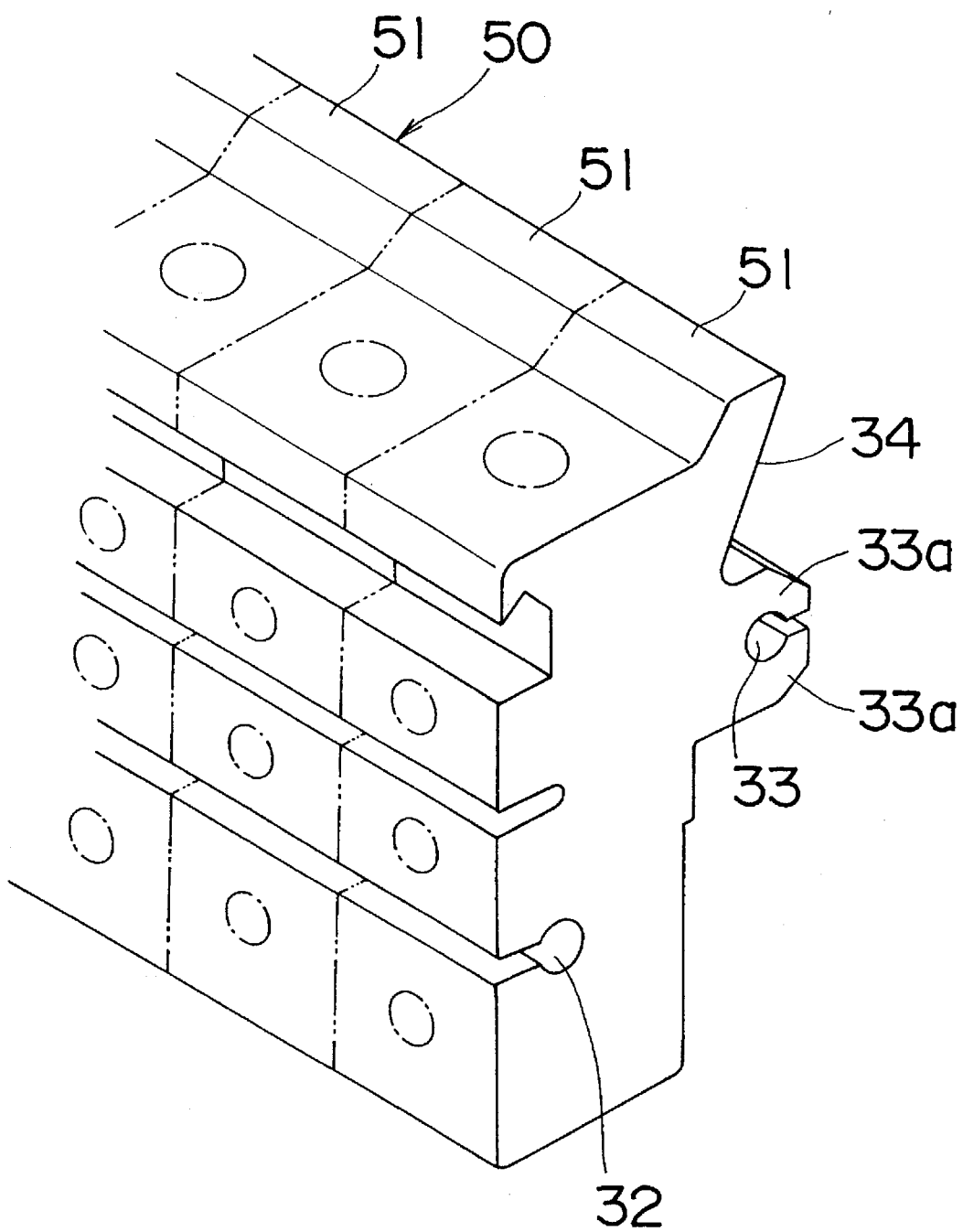
FIG. 2 is a perspective view of an irregularly shaped, long metallic material for housing, which is formed by extruding or drawing.
Figure 3:
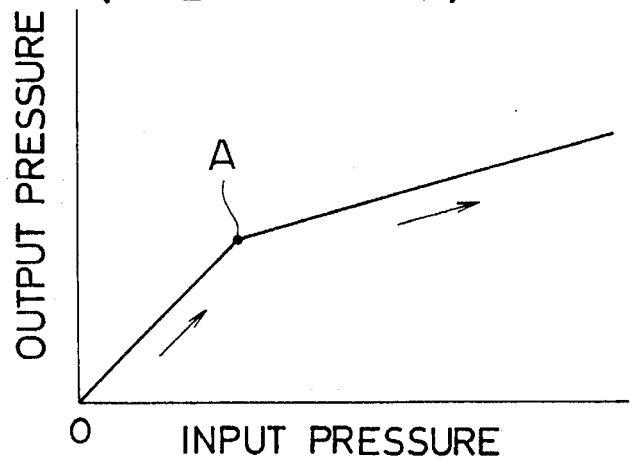
FIG. 3 is a characteristic diagram showing the relationship between the input and output pressures in a liquid pressure control device for load responding brake.
Figure 4:
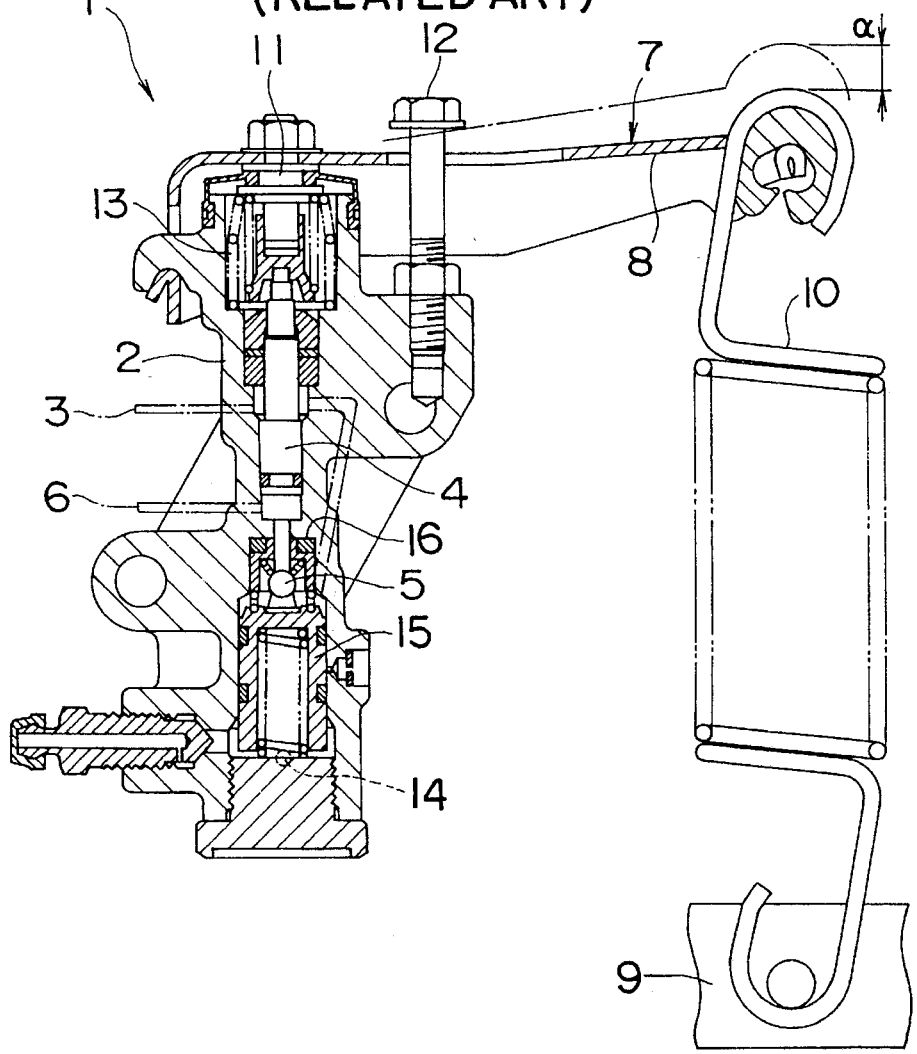
FIG. 4 is a longitudinal sectional view showing a liquid pressure control device for load responding brake relating to the present invention.

The material 50 used for the housing 22 is an irregularly shaped, long material made of a metal, for example, an aluminum alloy, which is formed by extrusion or drawing as shown in FIG. 2. The housing 22 is formed by cutting this long material to a predetermined length (as indicated by the two-dot chain line) and then by machining various holes and a through passage (as indicated by the chain line) in the cut material 51. The holes 32 and 33 to which the liquid pressure control device is mounted, which are formed at two places on the material 50 of the housing 22, are formed in extruding or drawing. The protrusions 33a and 33a provided so as to surround the installation hole 33 serves as reinforcing ribs.

As locking means for the load sensing lever 28 of the load sensing mechanism 27, the housing 22 is formed with an inclining plane 34, which makes an acute angle toward the load sensing lever 28 side with respect to the axis of the plunger 24, on the side on which the tension spring 29 of the load sensing mechanism 27 of the housing 22 is disposed. The inclining plane is formed in extruding or drawing.

At one place of the load sensing lever 28, a hole for installing a threaded stud 35 whose tip end is bent is formed. The threaded stud 35 is fixed to this hole by screwing a nut 35a. The locking position is set so that the movement of the end of the load sensing lever 28 is the operation position of the closing valve 25 plus α (α denotes movable range). Also, an adjustment is made so that the bent tip end of the threaded stud 35 engages with the inclining plane 34 of the housing 22 to control the movement of the load sensing lever 28 in any direction other than the urging direction of the tension spring 29.

To apply a force depending on the movable load of the vehicle to an end 24a of the plunger 24 disposed in the housing 22 via the press member 30 of the load sensing mechanism 27, a plug member 36, which slidably protrudes the end 24a of the plunger 24 in a fluid tight manner, is screwed at the end of the housing 22 on the load sensing lever 28 side. The plug member 36 is made of a ferrous material, and the end periphery thereof is formed with a small flange portion 36a so that when the plug member is screwed in the housing 22, a small circumferential groove 36b is formed between the flange portion 36a and the end face of the housing 22.

The press member 30 includes a contact 37 which is made of a ferrous material in contact with the plunger end 24a, a holding member 38 which is made of an aluminum alloy material or a synthetic resin material formed integrally, has a step portion 38a on the outer peripheral surface, and is provided with a threaded hole, and a bolt 39. The press member 30 is fixed to an installation hole, which is formed at a position where the load sensing lever 28 and the extension of the axis of the plunger 24 intersect.

Reference numeral 40 denotes a spring disposed between the holding member 36 of the press member 30 and the plug member 36. The spring 40 urges the load sensing lever 28 in one direction.

Since the plug member 36 and the press member 30 have a construction as described above, a dustproof boot 41 is mounted between the small circumferential groove 36b, which is formed between the plug member 36 and the end face of the housing 22, and the step portion 38a of the holding member 38 of the press member 30. The boot 41 protects the plunger end 24a and the outer peripheral side of the plug member 36 at the same time from dust and foreign matters coming from the outside.

Especially when a liquid pressure of the front wheel brake system of the master cylinder is applied to another inlet port 42 provided on the liquid pressure control device 21, the liquid pressure control device usually operates normally as described above. In the case where the liquid pressure control device 1 is installed on the vehicle, when the braking becomes improper in an abnormal condition, for example, because of the occurrence of oil leakage in the front wheel brake system, sufficient braking of the rear wheel brake system becomes impossible. To solve this problem, a mechanism is provided in which the pressure decrease operation of the liquid pressure control device 21 is stopped to provide a sufficient braking force to the rear wheel side.

Specifically, of the front wheel brake system and the rear wheel brake system of the master cylinder, the liquid pressure of the front wheel brake system is applied to the inlet port 42 of the liquid pressure control device so that when the liquid pressure of the front wheel brake system decreases abnormally because of oil leakage, the liquid pressure operation start point of the plunger 24 is moved in the high liquid pressure direction by the loss of the liquid pressure applied to the plunger end 24b, so that an output liquid pressure higher than the ordinary liquid pressure is sent to the rear wheel brake cylinder.

Thus, a sufficient brake can be applied to the vehicle even if the brake for the front wheels do not act.

The technology of the present invention is not limited to the technology of the above embodiment. The device may use means of other modes which fulfills the similar function. Also, the technology of the present invention can be modified or added variously in the scope of the above configuration.

As is apparent from the above description, the liquid pressure control device for load responding brake in accordance with the present invention achieves the effects described below.

In the liquid pressure control device for load responding brake according to claim 1, the housing is formed by cutting long material formed by extruding or drawing to a predetermined length and then by machining the cut material. Therefore, the cost for machining the outside shape of the housing can be reduced, and the productivity can be improved.

In the liquid pressure control device for load responding brake according to claim 2, the housing is formed with a plane inclining with respect to the axis of the plunger on the side on which the tension spring is disposed, and the load sensing lever is provided with a locking member so that the tip end thereof engages with the inclining plane of the housing to control the movement of the load sensing lever in any direction other than the urging direction of the tension spring 29. Therefore, a locking position can be set against the movement of the load sensing lever end of the load sensing mechanism by using a simple configuration, and any movement other than the normal movement can be controlled.

In the liquid pressure control device for load responding brake according to claim 3, a plug member for slidably protruding the end of the plunger in a fluid tight manner is provided, and a dustproof boot is mounted between the outer peripheral end of the plug member and the outer peripheral end of the press member of the load sensing mechanism. Therefore, it is unnecessary to perform grooving on the housing for installing the dustproof boot for protecting the plunger end. Thereupon, the dustproof boot can be mounted simply, and the machining cost can be reduced.

We claim:

1. A liquid pressure control device for load responding brake, comprising:

a valve mechanism, which is slidably disposed in a housing, for decreasing the liquid pressure of a master cylinder in a predetermined proportion and transmitting said liquid pressure to a rear wheel brake cylinder by the movement of a plunger operated in response to the liquid pressure from said master cylinder; and a load sensing mechanism in which a load depending on the movable load of a vehicle is applied to said plunger so as to move the pressure decrease operation start point of the valve mechanism;

said load sensing mechanism comprising a load sensing lever one end of which is supported by the housing of the valve mechanism so as to be capable of oscillating, a tension spring, one end of which is connected to the axle side and the other end is connected to the other end of said load sensing lever, for giving an urging force depending on the movable load of said vehicle, and a press member of pressing said plunger via said load sensing lever by means of said tension spring;

said housing is formed with a plane at the side of provision of said tension spring, said plane being inclined to the axis of said plunger, a locking member is secured to said load sensing lever such that the tip end of said locking member is bent so as to engage the inclined plane of said housing and such locking position is set so that the movement of the end of said load sensing lever can assume the position of movement of said valve mechanism plus a movable range and it is rendered possible to control the movement of said load sensing lever in any direction other than the urging direction of said tension spring.

* * * * *